United States Patent [19]

Atkin et al.

[11] Patent Number: 4,514,473
[45] Date of Patent: Apr. 30, 1985

[54] METHOD OF MANUFACTURING AN ELECTRODE FOR AN ELECTROCHEMICAL CELL, AND AN ELECTRODE MANUFACTURED BY THE METHOD

[75] Inventors: John Atkin, St Médard en Jalles; Marie-Thérèse Loustau, Bordeaux, both of France

[73] Assignee: Societe Anonyme Dite: SAFT, Romainville, France

[21] Appl. No.: 575,566

[22] Filed: Jan. 31, 1984

[30] Foreign Application Priority Data

Feb. 8, 1983 [FR] France .................................. 83 01923

[51] Int. Cl.³ .............................................. H01M 2/00
[52] U.S. Cl. ...................................... 429/10; 429/221; 429/222; 429/223; 429/225; 429/229; 29/623.1
[58] Field of Search ................. 429/10, 221, 222, 223, 429/225, 229, 209; 419/10, 11, 19; 29/623.1

[56] References Cited

U.S. PATENT DOCUMENTS

| | | | |
|---|---|---|---|
| 2,683,181 | 7/1954 | Salauze | 136/23 |
| 3,062,908 | 11/1962 | Salkind | 136/24 |
| 3,409,471 | 11/1968 | Sturm et al. | 429/10 |
| 3,811,952 | 5/1974 | Sieverson et al. | 429/10 |
| 4,260,523 | 4/1981 | Tsukamoto | 429/10 X |

Primary Examiner—Charles F. LeFevour
Attorney, Agent, or Firm—Kenyon & Kenyon

[57] ABSTRACT

An intimate mixture is prepared of a conductive metal powder and an active material in granular form. The mixture is then sintered by passing it through a variable magnetic field which is varied to produce trains of pulses in which the durations of the trains and intervals between trains are chosen in such a manner as to ensure that said metal powder is sintered without deteriorating said grains of active material.

13 Claims, 3 Drawing Figures

METHOD OF MANUFACTURING AN ELECTRODE FOR AN ELECTROCHEMICAL CELL, AND AN ELECTRODE MANUFACTURED BY THE METHOD

The present invention relates to a method of manufacturing an electrode for an electrochemical cell, and particularly, but not exclusively, for an alkaline storage cell.

BACKGROUND OF THE INVENTION

Essentially there are two known methods of manufacturing an electrode for an alkaline storage cell.

The first method consists in directly preparing the active material in a suitable granular form and in inserting it in tubes or pockets of perforated metal sheet which serves as a current collector.

In some applications that require very rapid discharging, electrodes obtained by this method do not have adequate electrical characteristics since they do not include a conductive network inside the active material itself.

The second method avoids this drawback since it consists in inserting the active material in a "metal sponge" made from a sintered support. To do this, the support is made first from a strip (which may optionally be perforated) of metal ribbon or foil coated with a layer of very fine metal powder. The metal may be nickel, iron, etc . . . . The coated strip is passed through a sintering furnace at high temperature (about 1000° C.) in the presence of inert or reducing gases in order to surface-weld the grains of the metal powder to one another and to the strip.

Alternatively, the strip may be preheated and then passed for a period of a few seconds through a furnace fitted with high frequency (300 KHz to 600 KHz) or medium frequency (1 KHz to 10 KHz) generators.

The resulting sintered sponge (to provide the electrode with good conductivity characteristics) is impregnated with metal salts suitable for the type of electrode in question: for example, nickel or cadmium nitrates, chlorides or sulfates. These salts are treated chemically to precipitate inside the sintered support in the form of nickel hydroxide, cadmium hydroxide, etc . . . . It is then necessary to eliminate, by chemical or by electrochemical means, the unwanted residual salts. After all these operations, an electrode is obtained which is composed of a sintered metal support with active material in the discharged state integrated into the pores thereof. It is clear that to arrive at this result, it is necessary to make use of complex and expensive equipment and to expend large amounts of energy.

Preferred implementations of the present invention provide a simplified method requiring less manufacturing equipment.

SUMMARY OF THE INVENTION

The present invention provides a method of manufacturing an electrode for an electrochemical cell, said electrode comprising an active material and a conductive metal powder, the method comprising the steps of:

preparing an intimate mixture of said powder and said active material in granular form; and sintering said mixture by passing it through a variable magnetic field, said magnetic field being varied to produce trains of pulses in which the durations of the trains and the intervals between trains are chosen in such a manner as to ensure that said metal powder is sintered without deteriorating said grains of active material, thereby retaining the electrochemical properties of said grains while imprisoning said grains in a matrix of sintered metal powder.

The magnetic field may oscillate at a frequency lying in the range 300 KHz to 10 MHz.

The duration of a single pulse train may be about 0.05 seconds to 2 seconds, and the intervals between pulse trains should be at least as long as the durations of the pulse trains.

In order to promote close contact between the grains of metal powder and the grains of active material, it is advantageous to compress the mixture using a pressure lying in the range 0.5 kg/cm$^2$ to 20 kg/cm$^2$.

Such compression may take place before the sintering operation, or it may take place during sintering in the intervals between pulse trains.

It is preferable to perform the sintering under an inert or a reducing atmosphere; the sintering gas may include water vapor.

The present invention also provides an electrode obtained by the above-defined method.

The mixture may comprise 10% to 90% metal powder and 90% to 10% active material (the percentages being by weight).

Advantageously 0.05% to 15% graphite may be included in the mixture. The graphite provides a surface covering on the grains of active material and reduces unwanted metal oxides which may appear when the active material is being heated.

The sintered mixture may be cut to any size and shape as desired; alternatively it may be used directly as an electrode without cutting.

In a variant, additional support may be provided for the mixture, with said additional support also serving as a current collector. The support may be added to the mixture before or after sintering. It may be in the form of an extended metal sheet or foil, and it may constitute a frame, or a grid, or other equivalent shape.

Steel or nickel-plated steel may be used.

BRIEF DESCRIPTION OF THE DRAWING

The manufacture of a nickel hydroxide electrode in accordance with the invention and for a nickel-cadmium storage cell is described by way of example with reference to the accompanying drawing in which.

MORE DETAILED DESCRIPTION

Figure 1:
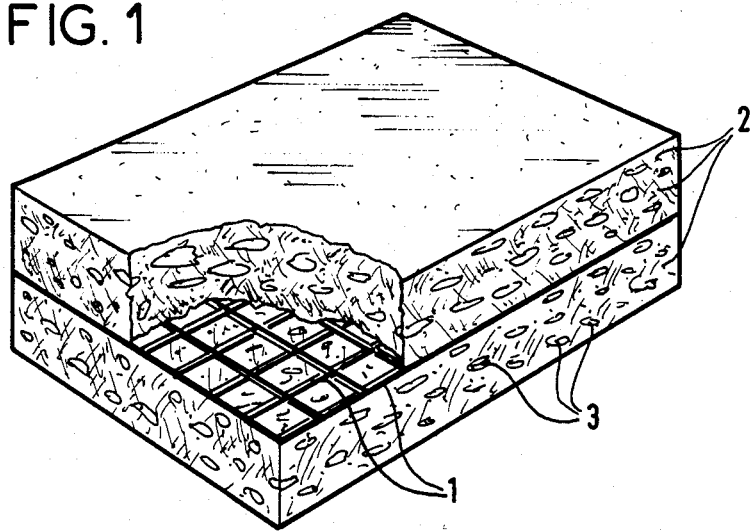
FIG. 1 is a very diagrammatic, partially cut-away perspective view of a portion of an electrode in accordance with the invention.

FIG. 1 is a diagram of a portion of a nickel hydroxide electrode. It comprises a strip of metal latticework 1 made of nickel or nickel-plated steel and covered on both sides in a mixture of nickel powder, nickel hydroxide powder and graphite powder in the proportion ranges specified above.

Figure 2:
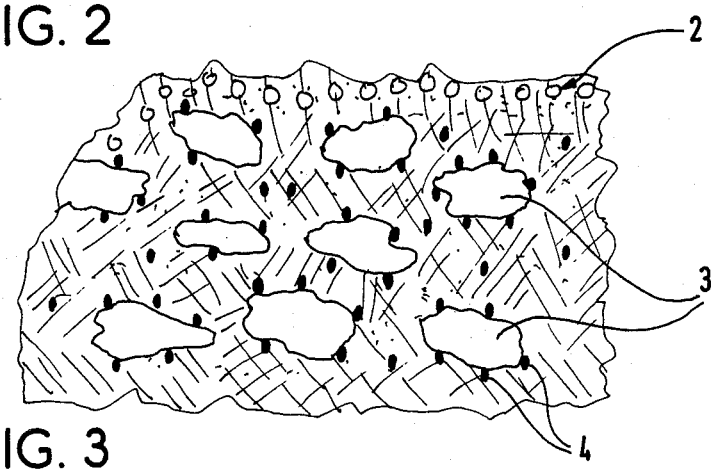
FIG. 2 is a diagram on a larger scale depicting the powder mixture used for the FIG. 1 electrode.

FIG. 2 shows grains of nickel 2, grains of nickel hydroxide 3 and flakes of graphite 4.

Figure 3:
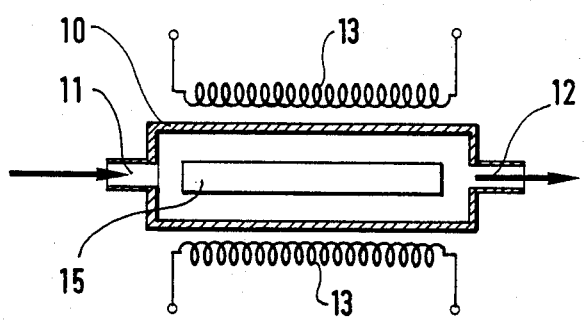
FIG. 3 is a very simplified diagram of apparatus for processing the FIG. 2 electrode.

After being compressed, the electrode 15 is placed in an induction furnace as shown in FIG. 3.

The furnace wall 10 is surrounded by an inductor 13 which produces an electric field at about 1 megahertz.

An inlet 11 and an outlet 12 are provided in the furnace wall 10 for circulating a light gas which may be inert or reducing in character, eg. hydrogen. The gas fills the furnace, expelling the air initially contained therein and escapes via an overflow tube, for example.

A varying magnetic field is applied for as short as possible a period compatible with sintering the grains of nickel without deteriorating the grains of nickel hydroxide. Thus, pulse trains of 0.1 seconds' duration may be used separated by intervals of 10 seconds.

While the field is being applied, the conductive bodies in the mixture (the nickel powder and the flakes of graphite) heat up since eddy currents are induced therein. The intervals between pulse trains allow the energy released by sintering the nickel to dissipate, and thus avoid overheating the grains of nickel hydroxide.

A suitable degree of sintering is obtained after applying ten pulse trains of 0.1 seconds' duration each.

In a variant implementation, the reducing gas includes water vapor. It has been observed that this improves the electrical efficiency of the nickel hydroxide.

The method in accordance with the invention enables an electrode having its active material integrated in a sintered support to be obtained directly. Impregnation steps and chemical processing steps are avoided.

Naturally various modifications can be applied to the method just described. For example, cooling could be improved by a flow of cooling gas, eg. using a cooling coil or other suitable means.

Clearly the mixture can be compressed either by means of rollers or else by means of a static press, and in a variant of the method, compression steps may be inserted in between successive sintering and cooling steps.

As has already been outlined above, it is not essential to have a strip of metal latticework 1. In another variant, the latticework may be applied to the mixture after sintering, or some other form of current collector may be used.

The invention is not limited to an electrochemical cell of the alkaline storage cell type. By way of example, the active material may be chosen from the group consisting of the oxides of lead, iron, cadmium, and zinc, and the hydroxides of cadmium and nickel.

The metal powder may be chosen from the group consisting of nickel, lead, cadmium, iron, copper, silver, and zinc.

We claim:

1. A method of manufacturing an electrode for an electrochemical cell, said electrode comprising an active material and a conductive metal powder, the method comprising the steps of:

preparing an intimate mixture of said powder and said active material in granular form; and passing the mixture through a pulsed alternating magnetic field, the pulse duration and the interval between pulses being selected to heat the conductive metal powder sufficiently to sinter the powder without deteriorating the grains of active material.

2. A method according to claim 1, wherein the magnetic field oscillates at a frequency lying in the range 300 KHz to 10 MHz.

3. A method according to claim 2, wherein the duration of a single pulse train is in the range 0.05 seconds to 2 seconds, and wherein the intervals between pulse trains are at least as long as the durations of the pulse trains.

4. A method according to claim 1, wherein said mixture is compressed using a pressure lying in the range 0.5 kg/cm$^2$ to 20 kg/cm$^2$.

5. A method according to claim 4, wherein said pressure is applied in the intervals between successive pulse trains.

6. A method according to claim 1, wherein the sintering is performed under an inert or a reducing atmosphere.

7. A method according to claim 6, wherein the sintering gas contains water vapor.

8. A method according to claim 1, wherein a metal current collector is integrated in said mixture before sintering.

9. A method according to claim 1, wherein a metal current collector is added to said mixture after it has been sintered.

10. A method according to claim 8 or 9, wherein the structure of said current collector is selected from the group comprising a strip, an extended metal sheet, a metal foil, and bars making up a frame or a grid.

11. An electrode obtained by implementing the method of claim 1, wherein said mixture comprises the following percentages by weight:

10% to 90% metal powder; and

90% to 10% active material.

12. An electrode according to claim 11, wherein 0.05% to 15% by weight of graphite is included in said mixture.

13. An electrode according to claim 11, wherein said active material is chosen from the group consisting of the oxides of lead, iron, cadmium, and zinc, and the hydroxides of cadmium and nickel, and wherein said metal powder is chosen from the group consisting of nickel, lead, cadmium, iron, copper, silver and zinc.

* * * * *

REEXAMINATION CERTIFICATE (1001st)
United States Patent [19]
Atkin et al.

[11] B1 4,514,473
[45] Certificate Issued  Jan. 24, 1989

[54] METHOD OF MANUFACTURING AN ELECTRODE FOR AN ELECTROCHEMICAL CELL, AND AN ELECTRODE MANUFACTURED BY THE METHOD

[75] Inventors: John Atkin, St Médard en Jalles; Marie-Thérèse Loustau, Bordeaux, both of France

[73] Assignee: Societe Anonyme Dite: SAFT, Romainville, France

Reexamination Request:
No. 90/001,449, Feb. 18, 1988

Reexamination Certificate for:
Patent No.: 4,514,473
Issued: Apr. 30, 1985
Appl. No.: 575,566
Filed: Jan. 31, 1984

[30] Foreign Application Priority Data

Feb. 8, 1983 [FR] France ................. 83 01923

[51] Int. Cl.⁴ ............... H01M 4/36; H01M 4/56; H05B 5/00
[52] U.S. Cl. ................... 429/221; 429/222; 429/223; 429/225; 429/229; 219/10.57
[58] Field of Search ............... 429/221–223, 429/225, 229; 219/10.57

[56] References Cited

U.S. PATENT DOCUMENTS

| | | |
|---|---|---|
| 2,683,181 | 7/1954 | Salauze . |
| 3,062,908 | 11/1962 | Salkind et al. . |
| 3,331,686 | 7/1967 | Bonis et al. .......... 419/52 X |
| 3,409,471 | 11/1968 | Sturm et al. . |
| 3,476,604 | 11/1969 | Faber .............. 219/10.57 X |
| 3,654,426 | 4/1972 | Brinkmann et al. ...... 219/10.57 X |
| 3,811,952 | 5/1974 | Siwersson et al. . |
| 4,260,523 | 4/1981 | Tsukamoto ............ 252/447 |
| 4,376,328 | 3/1983 | Mefferd ............ 228/212 X |
| 4,412,841 | 11/1983 | Du Broff et al. ........ 201/6 X |
| 4,460,663 | 7/1984 | Stutzbach et al. ....... 429/176 X |

FOREIGN PATENT DOCUMENTS

| | | |
|---|---|---|
| 3015981 | 11/1981 | Fed. Rep. of Germany . |
| 2143636 | 2/1973 | France . |
| 55-163768 | 6/1979 | Japan . |
| 57-1189455 | 11/1982 | Japan . |

OTHER PUBLICATIONS

Kirk–Othmer, *Encyclopedia of Chemical Technology*, vol. 11, pp. 542–550.
Derwent Abstract 83676 (corresponding to German 3015981) 11/81.

*Primary Examiner*—S. J. Kalafut

[57] ABSTRACT

An intimate mixture is prepared of a conductive metal powder and an active material in granular form. The mixture is then sintered by passing it through a variable magnetic field which is varied to produce trains of pulses in which the durations of the trains and intervals between trains are chosen in such a manner as to ensure that said metal powder is sintered without deteriorating said grains of active material.

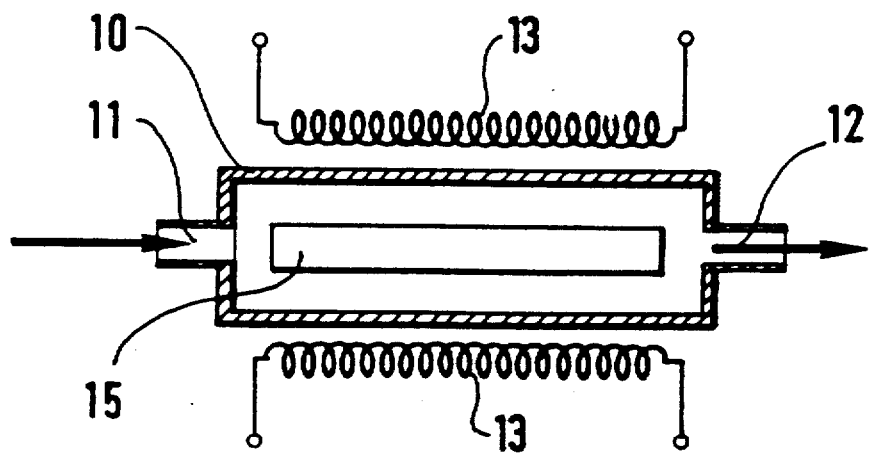

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 8 and 9 are cancelled.

Claims 1, 4 and 10 are determined to be patentable as amended.

Claims 5-7 and 11-13, dependent on an amended claim, are determined to be patentable.

1. A method of manufacturing an electrode for an electrochemical cell, said electrode comprising an active material and a conductive metal powder, the method comprising the steps of:

preparing an intimate mixture of said *conductive metal* powder and said active material in granular form; [and]

*integrating said intimate mixture with a metallic current collector; and* passing the *integrated* mixture *and. current collector* through [a pulsed] *an* alternating magnetic field, *induced by trains of current pulses in an inductor for exposure to a plurality of pulse trains separated by intervals, the frequency of said pulses lying between about 1 MHz and about 10 MHz,* the [pulse] duration *of each pulse train being greater than 0.05 second* and the interval between [pulses] *successive pulse trains* being [selected] *at least equal to the duration of one pulse train, such as* to heat the conductive metal powder sufficiently to sinter the powder without deteriorating the grains of active material.

4. A method according to claim 1 wherein said *integrated* mixture [is] *and current collector are* compressed using a pressure lying in the range 0.5 kg/cm$^2$ to 20 kg/cm$^2$.

10. A method according to claim [8 or 9] *1*, wherein the structure of said current collector is selected from the group comprising a strip, an extended metal sheet, a metal foil, and bars making up a frame or a grid.

* * * * *